(12) United States Patent
Jouhier

(10) Patent No.: US 11,385,869 B2
(45) Date of Patent: Jul. 12, 2022

(54) CODE MODIFICATION TECHNIQUE

(71) Applicant: Sage Global Services Limited, Newcastle upon Tyne (GB)

(72) Inventor: Bruno Claude Jean-Marie Jouhier, La Garenne-Colombes (FR)

(73) Assignee: Sage Global Services Limited, Newcastle upon Tyne (GB)

( * ) Notice: Subject to any disclaimer, the term of this patent is extended or adjusted under 35 U.S.C. 154(b) by 0 days.

(21) Appl. No.: 16/791,537

(22) Filed: Feb. 14, 2020

(65) Prior Publication Data
US 2020/0264849 A1    Aug. 20, 2020

(30) Foreign Application Priority Data

Feb. 17, 2019 (EP) ..................... 19157606

(51) Int. Cl.
   *G06F 8/36*   (2018.01)
   *G06F 8/33*   (2018.01)
   *G06F 8/34*   (2018.01)

(52) U.S. Cl.
   CPC ................ *G06F 8/36* (2013.01); *G06F 8/33* (2013.01); *G06F 8/34* (2013.01)

(58) Field of Classification Search
   CPC ................ G06F 8/34; G06F 8/33; G06F 8/36
   See application file for complete search history.

(56) References Cited

U.S. PATENT DOCUMENTS

| 10,437,572 | B1 * | 10/2019 | Ghaleb ............... G06F 8/37 |
| 2005/0204340 | A1 | 9/2005 | Ruminer et al. | |
| 2008/0052674 | A1 * | 2/2008 | Little ............... G06F 8/36 |
| | | | 717/120 |
| 2011/0219355 | A1 | 9/2011 | Matsumoto | |
| 2014/0282384 | A1 * | 9/2014 | Pamer ............... G06F 8/437 |
| | | | 717/113 |
| 2016/0092264 | A1 * | 3/2016 | Fontenot ............ G06F 9/4843 |
| | | | 718/102 |
| 2017/0053243 | A1 | 2/2017 | Rajwade | |

OTHER PUBLICATIONS

European Search Report for European Patent Application No. EP19157606, dated Aug. 6, 2019, 2 pages.
Cazazola, et al., "@Java: Bringing a Richer Annotation Model to Java," Computer Languages, Systems & Structures, 2014, 40, pp. 2-18.

* cited by examiner

*Primary Examiner* — Wei Y Zhen
*Assistant Examiner* — Amir Soltanzadeh
(74) *Attorney, Agent, or Firm* — Burns & Levinson LLP; Daniel McGrath

(57) ABSTRACT

A system for modifying code, said system comprising a code repository for storing code and a first code editor. The first code editor is operable to identify decorator definition code which defines metadata from code stored in the code repository and which comprises a first code component comprising source code annotated by one or more decorators and a second code component comprising the decorator definition code defining the metadata. The first code editor is further operable to present variables associated with the metadata on a user interface, and modify the variables associated with the metadata in accordance with modifications input to the code editor by a user via a user interface.

10 Claims, 5 Drawing Sheets

CODE MODIFICATION TECHNIQUE

CROSS-REFERENCE TO RELATED APPLICATION

This application claims priority to and the benefit of European Patent Application No. EP19157606.5, filed Feb. 17, 2019, which is incorporated herein by reference.

TECHNICAL FIELD

The present disclosure relates to systems and methods for modifying code.

BACKGROUND

In modern computing languages such as JavaScript and TypeScript, software application development can be conveniently achieved by developing code as a series of separate "packages" stored in a package repository and managed by a package manager. The code packages are assembled into the complete version of the source code and compiled just before run-time. Changes to the code are made by editing the relevant code packages. The package-based approach makes version control and error tracking easier and enables different developers or different teams of developers to easily work on different aspects of the code.

Certain types of applications require the involvement of a subject matter specialist who may not necessarily be a coding expert. Examples include enterprise resource planning (ERP) applications which require the expertise of business analysts in specifying application elements such as "business objects" and accountancy applications such as payroll applications which require the expertise of payroll tax experts (e.g. those who are familiar with the legal and accountancy technicalities associated with payroll calculations).

Even though use of package-based code development improves application development (particularly where frequent changes are required) it is nonetheless necessary to modify code using conventional code editors. Such code editors require coding expertise to use. In order to make changes to the code, subject matter experts (e.g. business analysts or payroll tax experts) must also be coding experts or must be assisted by a coding expert.

It is desirable to provide a technique for updating code, particularly code relating to large enterprise-class software applications, that requires a reduced level of coding expertise.

SUMMARY

In accordance with a first aspect of the disclosure, there is provided a system for modifying source code. The system comprises a repository for storing code, and a first code editor. The first code editor is operable to: access source code stored in the repository, said source code for implementing a software application or part of a software application and annotated by one or more decorators; identify from the source code one or more decorator declarations; identify decorator definition code associated with each decorator declaration; identify metadata code defined in the decorator definition code and associated with the implementation of the application; present the metadata code on a user interface; receive metadata modification data input by a user of the first code editor; and modify the metadata code in accordance with the metadata modification data. The source code defines a plurality of application elements of the software application and each application element is associated with one or more attributes, each attribute defined by metadata code in the decorator definition code corresponding to the decorator declaration associated with the application element.

Optionally, the first code editor is operable to modify the metadata code by downloading a copy of the source code, modifying the metadata code of the copy of the source code in accordance with the metadata modification data and uploading a modified copy of the source code to the repository.

Optionally, each attribute is defined by a class property annotated by one or more decorators.

Optionally, the source code is written in TypeScript code.

Optionally, the decorator definition code defines one or more functions and the metadata code comprises variables associated with the functions.

Optionally, the system further comprises a second code editor, said second code editor comprising a conventional code editor operable to enable a user to edit the code stored in the code repository.

Optionally, the first code editor is run on a first client device and the second code editor is run on a second client device.

Optionally, the code repository is run on an application server and the first client device and second client device are connected to the application server via a data network.

Optionally, the user interface comprises a code autocomplete function.

In accordance with a second aspect of the disclosure, there is provided a method of modifying source code stored in a repository. The source code is annotated by one or more decorators and for implementing a software application or part of a software application. The method comprises: accessing source code stored in the repository; identifying from the source code one or more decorator declarations; identifying decorator definition code associated with each decorator declaration; identifying metadata code defined in the decorator definition code and associated with the implementation of the application; presenting the metadata code on a user interface; receiving metadata modification data input by a user; and modifying the metadata code in accordance with the metadata modification data. The source code defines a plurality of application elements of the software application and each application element is associated with one or more attributes, each attribute defined by metadata code in the decorator definition code corresponding to the decorator declaration associated with the application element.

In accordance with a third aspect of the disclosure, there is provided a simplified code editor for modifying source code stored in a repository, said source code annotated by one or more decorators and for implementing a software application or part of a software application. The code editor is operable to: access source code stored in the repository, said source code for implementing a software application or part of a software application and annotated by one or more decorators; identify from the source code one or more decorator declarations; identify decorator definition code associated with each decorator declaration; identify metadata code defined in the decorator definition code and associated with the implementation of the application; present the metadata code on a user interface; receive metadata modification data input by a user of the code editor; modify the metadata code in accordance with the metadata modification data. The source code defines a plurality of application elements of the software application and each application element is associated with one or more attributes, each attribute defined by metadata code in the decorator definition code corresponding to the decorator declaration associated with the application element.

In accordance with a fourth aspect of the disclosure, there is provided a computer program comprising instructions which when performed by a suitably programmed computer, control the computer to implement a code editor in accordance with the third aspect of the disclosure.

In accordance with a fifth aspect of the disclosure, there is provided a software application defined by source code suitable for modification by a system according to the first aspect of the disclosure. The application is defined by source code comprising one or more decorator declarations, each decorator declaration associated with decorator definition code. The decorator definition code comprising metadata code and associated with the implementation of the application. The source code defines a plurality of application elements of the software application and each application element is associated with one or more attributes, each attribute defined by metadata code in the decorator definition code corresponding to the decorator declaration associated with the application element.

Optionally, the application is an enterprise resource planning application.

In accordance with aspects of the present technique, a modified code editor is provided which is adapted to enable a user without a high degree of coding expertise to access and modify data from a specially structured source code. Specifically, the modified code editor enables such a user to readily interact with, and modify, metadata code. Typically, the metadata code is associated with an application that the source code implements.

Metadata code is code within the source code that defines application "metadata". Metadata, broadly speaking, is data that specifies information about how other data is handled or processed by the application. Certain application metadata for example specifies how the application operates on certain input data. Other application metadata, for example, specifies how data is stored within the system. An example of metadata in the context of an enterprise resource planning (ERP) application is data defining business rules which define attributes of business objects. An example of metadata in the context of a payroll calculation applications is data defining the conditions and formulas that define how individual payroll calculations (e.g. tax contributions, pension contributions etc) are calculated. Other examples of application metadata include data that specifies how data is persisted in application databases (table names, column names etc) and how data is exposed in a Web API (which classes and which properties are exposed etc).

Users who may be required to make changes to application metadata may typically be experts on the subject matter that the metadata relates to (for example, tax experts for payroll applications), but not coding experts.

In accordance with aspects of the technique, the source code is annotated with a plurality of decorators and is structured so that metadata code, associated with the application which the source code implements, is defined within corresponding decorator definition code. Advantageously, the modified code editor uses this structure to readily isolate the metadata code from the rest of the source code. In this way, with no coding expertise required from the user, the conventionally complex task of identifying metadata code from source code and, if necessary, making changes to the metadata code, is greatly simplified.

Advantageously, this technique can be implemented without the need of complicated "abstracting" mechanisms normally required to simplify coding tasks. The technique simply requires the provision of a modified code editor and that decorators are used to annotate the source code and metadata code is defined in the corresponding decorator definition code.

Advantageously, in certain embodiments, the metadata code can be written in the same programming language as the remainder of the source code. Advantageously, this can further simplify the implementation of the application.

Various further features and aspects of the disclosure are defined in the claims.

BRIEF DESCRIPTION OF THE DRAWINGS

Embodiments of the present disclosure will now be described by way of example only with reference to the accompanying drawings where like parts are provided with corresponding reference numerals and in which.

DETAILED DESCRIPTION

Figure 1:
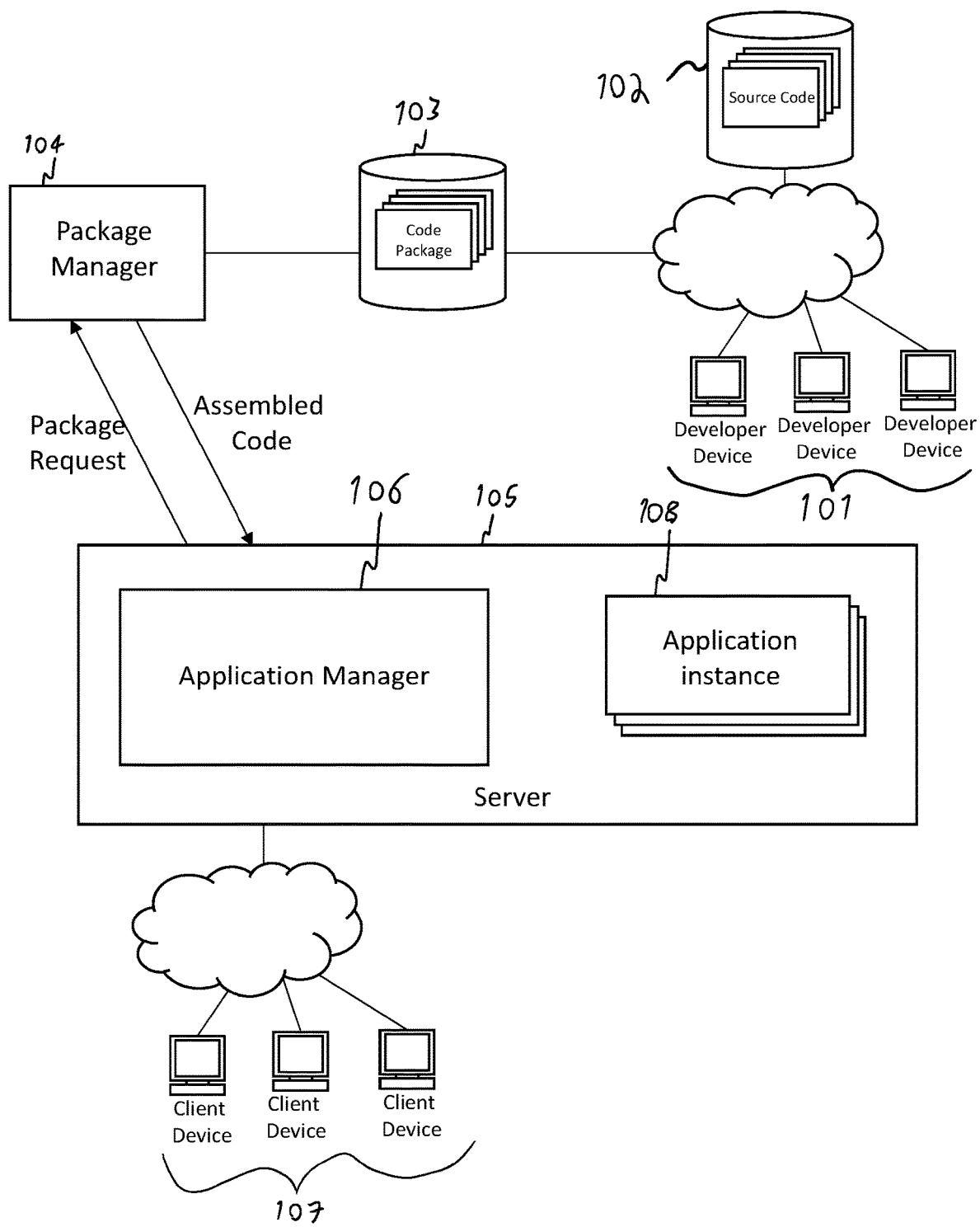
FIG. 1 provides a schematic diagram of a conventional technique for developing and deploying a cloud-based application.

FIG. 1 provides a schematic diagram depicting the development and deployment of a conventional enterprise-class cloud-based application.

Expert software developers use developer devices 101 running code editing tools to create and modify source code for implementing instances of the application.

During development, source code is stored in a code repository 102 enabling the software developers to collaborate on the development of the source code. The source code repository 102 is typically provided by a code development environment enabling the source code under development to be tested, error-checked and subject to version control.

Once a piece of source code has been completed and error checked it is published as a code package to a package repository 103 under the control of a package manger 104. An instance of a typical enterprise-class application involves the combination of source code from multiple code packages. The particular code packages used will depend on the requirement of the instant of the application.

An application server 105 has running thereon an application manager 106 which receives requests from client devices 107 for access to an instance of the application. On receipt of such a request, the application manager 106 communicates a request to the package manager 104 for the relevant code packages required to deploy the particular instance of the application. The package manager 104 communicates assembled code from the relevant code packages to the application manager 106 which then instantiates an instance of the application 108.

The package-based approach to application deployment allows instances of the application to be customised for different users by the selection of relevant code packages. Further, the use of package-based code development enables multiple software developers to collaborate on the development of source code for different code packages.

However, the technique for developing source code described with reference to FIG. 1 requires that the software developers are expert coders and in particular have the expert skills necessary to use the complex code editing tools conventionally used to write and modify the source code.

This is a drawback in the development and deployment of certain types of applications, particular those that include critical components that depend in part on being developed and updated by subject matter experts who may not be coding experts.

Such subject matter experts are typically required to ensure that metadata associated with the application is correctly defined and updated.

Many different types of enterprise class applications require subject matter experts to ensure that application metadata is correctly defined and updated.

Two particular examples of such applications include enterprise resource planning (ERP) applications and payroll applications.

A typical ERP application comprises application elements such as "business objects". Examples of business objects include for example "customer", "sales order", "product", "invoice" etc. Each such business object application element is associated with one or more attributes, for example, one or more business rules defining the properties of the business object. For example, the business rules may encode control rules that are applied before a new customer or a new order can be entered into a system running the ERP application.

The business rules associated with a business object are critical to the functionality provided by a typical ERP application and are therefore normally defined by a subject matter expert such as a business analyst. However, such business analysts, are rarely coding experts which means that whenever source code defining business rules needs to be written or updated, both a business analyst and an expert software developer are required or a business analyst who is also an expert software developer is required.

Payroll application development also typically requires the input of non-coding experts. A typical payroll application requires a payroll calculation engine to be implemented which comprises application elements, specifically "pay plan" elements. Examples of such pay plan elements include income tax deductions, pension contributions, holiday pay entitlements and so on. Such application elements are defined by various attributes (i.e. the formulas and conditions which define the pay plan elements). Ensuring that the source code is up to date to provide the correct attributes (i.e. the formulas and conditions which define the pay plan elements) is essential to the correct implementation of an instance of a payroll application and must be overseen by a subject matter expert i.e. a payroll expert such as an accountant familiar with the jurisdiction in which the instance of the application is going to be deployed. Again, it is unlikely that such a subject matter expert is also a coding expert.

In accordance with examples of the subject technology, a technique is provided that enables a simplified code editing tool to be implemented which can be readily used by a non-coding expert to update source code, and in particular application metadata defined in the source code. Moreover, the simplified code editing tool can be readily integrated into the application deployment and development environment described with reference to FIG. 1.

Figure 2:
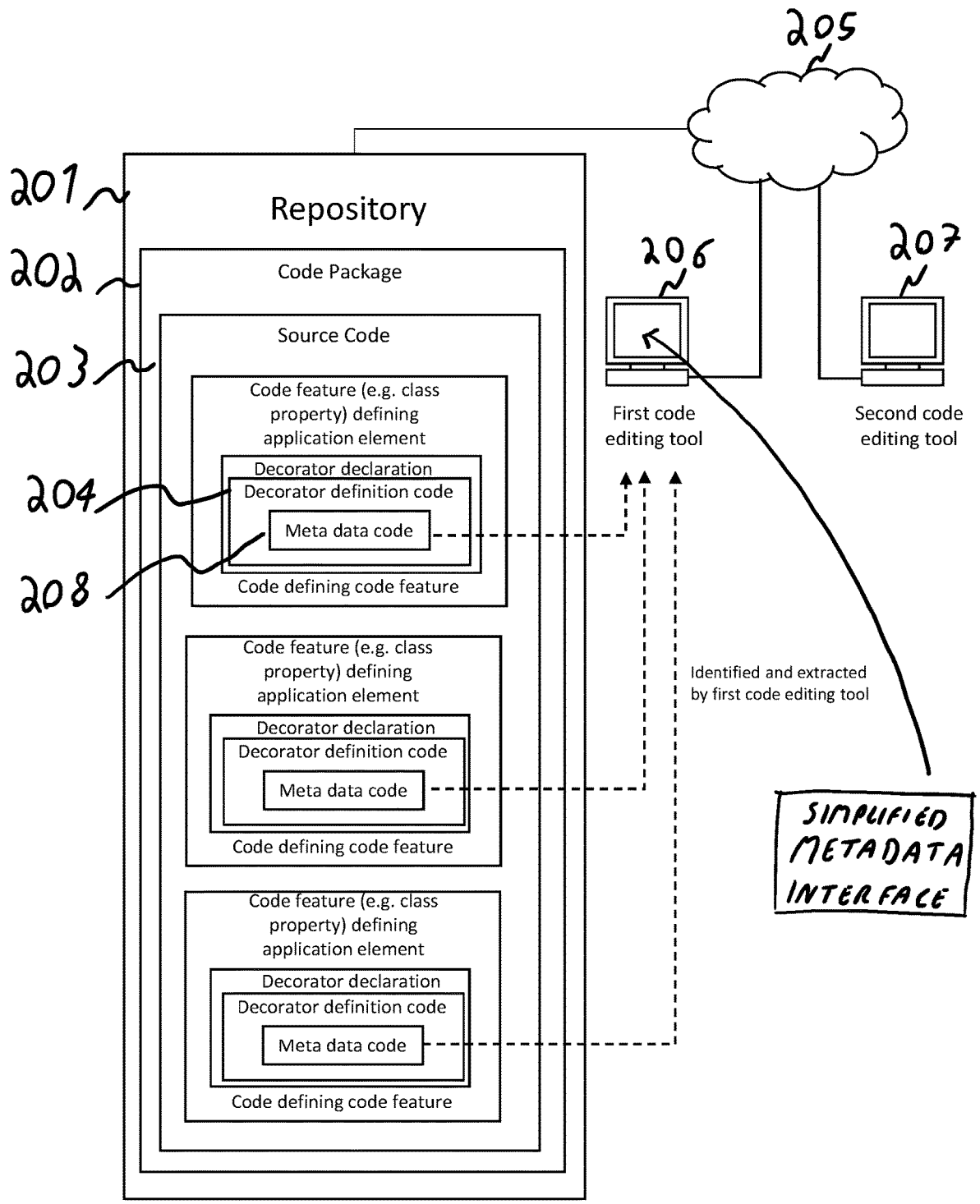
FIG. 2 provides a schematic diagram of a system for modifying code in accordance with certain embodiments of the disclosure.

FIG. 2 provides a schematic diagram of a system for implementing a code editing technique in accordance with certain embodiments of the disclosure.

A repository 201, provided for example by a conventional code repository contains a code package 202 comprising source code 203 defining an application or a part of an application.

The repository 201 is typically run on a suitably programmed server device and the source code is typically written in TypeScript.

The source code is "annotated" by one or more decorators.

More specifically, code features of the source code, for example classes, class properties, functions etc, defining elements of the application (application elements), are associated with decorator declarations, which, at compile time, modify the code feature with which they are associated.

The source code 203 further comprises decorator definition code 204 associated with each decorator declaration. The decorator definition code 204 specifies metadata code which defines an attribute associated with the application element to which the decorator relates. For example, a class property of a class is annotated by a decorator and when loaded, the class property is modified in accordance with the metadata specified in the decorator definition code associated with the decorator annotating the class property.

In this way, metadata associated with an application element is determined based on the decorator definition code 204, and in particular the metadata code of the decorator definition code 204.

The system further comprises a first client device 206, provided by a suitable computing device, for example a personal computer, connected via a data network 205 to the repository 201. The first client device 206 has running thereon software providing a simplified code editing tool.

The simplified code editing tool is arranged to access (e.g. download to local storage) the source code 203 and identify from the downloaded code package the decorator definition code 204 specifying the metadata code 208 defining the various application element attributes.

The simplified code editing tool is further arranged to identify the metadata code 208 and present this on an interface provided by the simplified code editor.

The metadata code is typically presented on a suitable interface displayed on a display of the client device 206. The interface enables a user to make changes to the metadata code using conventional user input means (e.g. a mouse and keyboard).

The metadata code can be presented in any suitable way. In certain examples, the metadata code is in a suitable simplified notation such as JSON (JavaScript Object Notation) and edited via a suitable text editor provided on the interface displayed on the display of the client device.

In certain examples the metadata code can be presented on the interface in an even simpler manner, for example in a form with checkboxes, combo boxes, and text fields. In such examples, the user does not even need to be familiar with object notation such as JSON and can modify the metadata code with simple "point and click" actions. A rich code editor can be provided for more complex cases.

The interface thus allows a user to make changes to the metadata code and, responsive to this, the simplified code editing tool makes corresponding changes to the decorator definition code in the local version of the source code 203 thereby creating a modified version of the source code 203.

The simplified code editor then uploads the modified version of the code package to the repository 201.

In certain embodiments, the simplified code editor is arranged such that modifications to the code can be made directly to the copy of the code package stored in the repository 201 rather than downloading a copy and modifying it locally and then uploading the modified copy.

The system further comprises a second client device 207 which can also be provided by a suitable computing device such as a personal computer and is also connected to the repository 201 via the data network. The second client device 207 has running thereon a conventional code editing tool (for example Visual Studio Code). The conventional code editing tool is arranged to access (e.g. download to local storage) the source code 202 and provide an interface enabling a user to modify the source code in a conventional way and then upload the modified version of the source code to the repository 201. In certain embodiments, modifications to the code can be made directly to the copy of the code package stored in the package repository rather than downloading a copy and modifying it locally and then uploading the modified copy.

Figure 3:
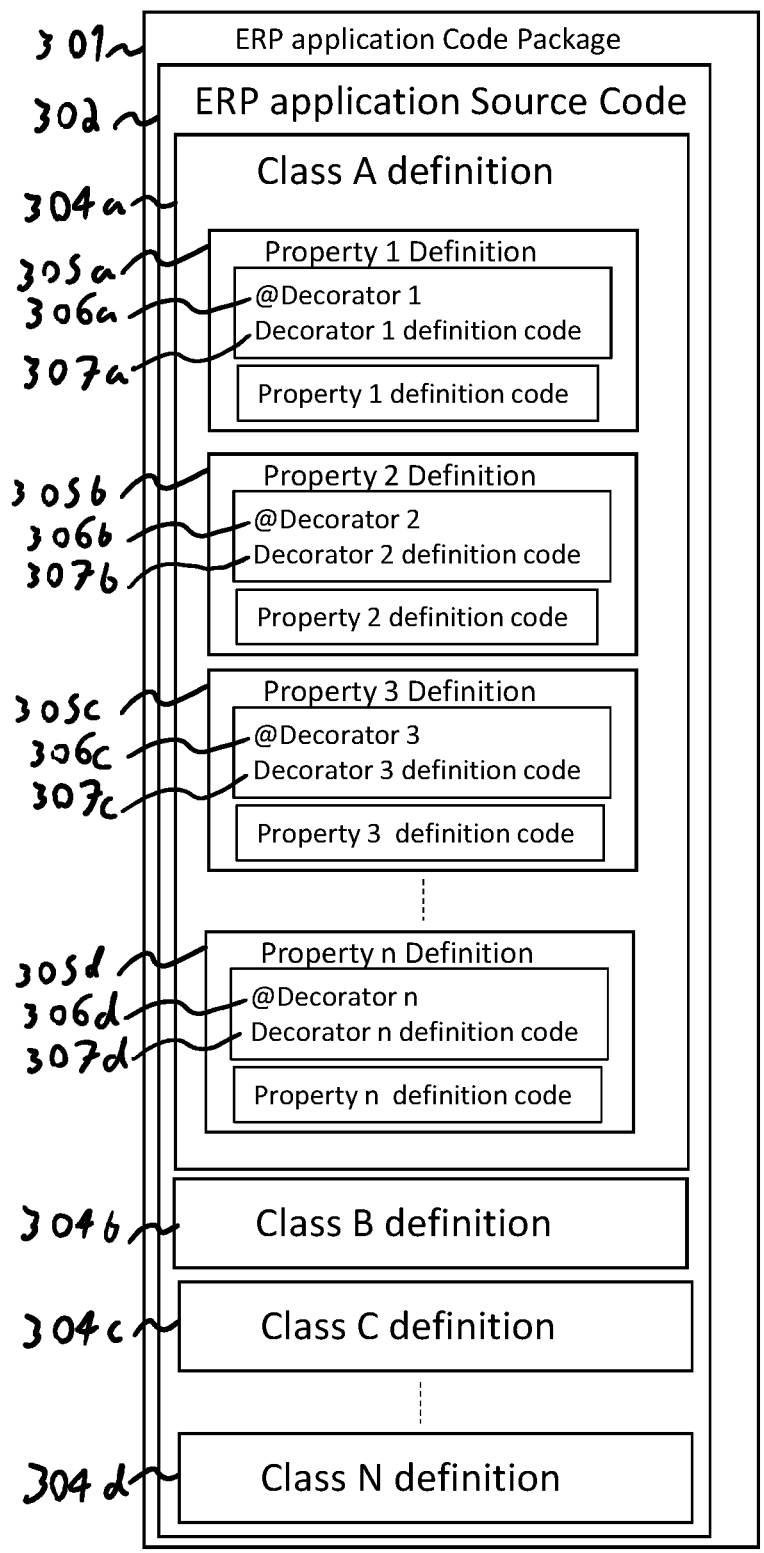
FIG. 3 provides a schematic diagram depicting the arrangement of a code package in accordance with certain embodiments of the disclosure.

FIG. 3 provides a schematic diagram depicting the arrangement of a code package suitable for use with the technique described with reference to FIG. 2.

In particular, FIG. 3 shows an ERP application code package 301 which comprises source code 302. The source code 302 defines a number of application elements of an ERP application. As described above, in use, when modifications to the source code 302 have been made, the source code is incorporated into the ERP application code package and published to a package repository. The code package is combined with other code packages for instantiating, an instance of the ERP application.

In one example, the application elements that the source code 301 defines are "business objects". Each business object is associated with one or more attributes, for example "business rules". These attributes define the behaviour of business objects when the ERP application is instantiated. The attributes are defined by metadata and particularly metadata code. In a typical deployment, the metadata defining the business rules may need frequent modification by a business analyst.

Examples of typical business objects include "customer", "sales order", "product", "invoice". Some business objects may comprise further properties (i.e. comprise further application elements). For example, a "product" business object may have further properties such as "code", a "description", a "category", a "supplier", a "brand".

Examples of typical business rules for the business object "product" include, for example, control rules defining which properties are mandatory before a new product can be entered into a system running the ERP application, for example validity ranges for dates, decimal precision for quantities and so on.

The source code 302 includes code defining one or more classes 304a, 304b, 304c, 304d.

The code defining each class typically contains code defining a number of class properties 305a, 305b, 305c, 305d.

Typically, each class property is associated with a business object or business object properties. For example, with reference to FIG. 5, the first class property code 305a defines a first business object; the second class property code 305b defines a second business object; the third class property code 305c defines a third business object; and the nth class property code 305d defines an nth business object. As described above, each business object is defined by various attributes, i.e. business rules. These business rules are defined by business rule metadata (i.e. metadata defining the properties of a business object).

The business rule metadata associated with each business object, rather than being defined directly in the source code are instead incorporated into the class property definitions by the insertion in the code of TypeScript decorator declarations 306a, 306b, 306c, 306d and corresponding decorator definition code 307a, 307b, 307c, 307d. The decorator definition code 307a, 307b, 307c, 307d comprises business rule metadata code defining the business rules.

As is known in the art, a decorator is a TypeScript declaration which can be associated with the declarations of other code features such as example class declarations.

Figure 5:
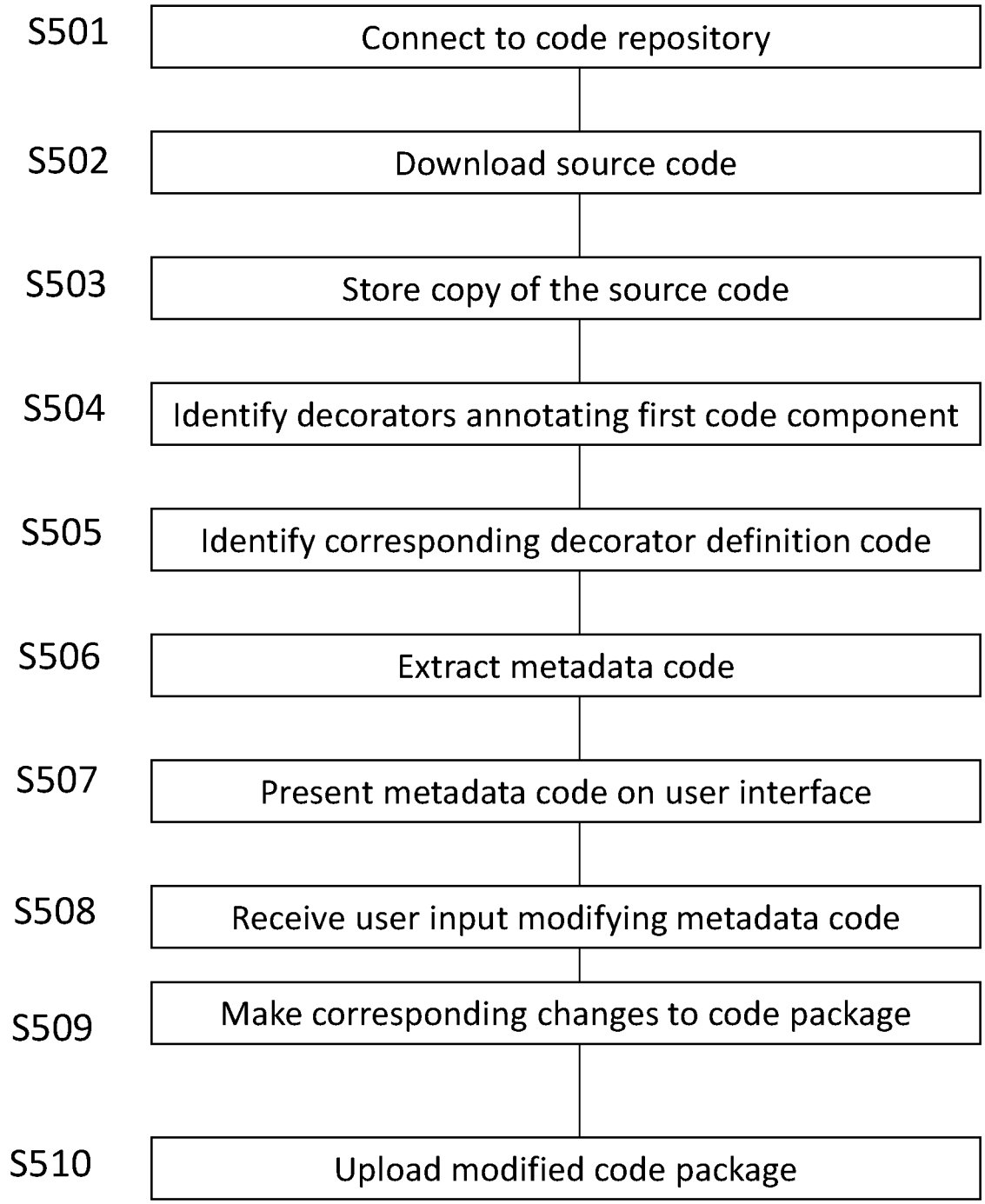

A decorator can be associated with a class declaration by declaring the decorator directly before the class declaration or within the class declaration (as depicted schematically in FIG. 5). If associated with a class declaration, at run time, the class will be modified in accordance with the decorator. Modifications applied to a class by a decorator are dependent on the decorator definition which is defined in decorator definition code 307a, 307b, 307c, 307d.

By arranging source code, for example ERP application source code, as described above, and in particular by defining ERP application metadata using decorators, code relating to the ERP application metadata (e.g. the business object rules) can be readily isolated from the rest of the source code. Advantageously, the use of decorators in this way can be used to provide a convenient and simplified mechanism to make changes to the ERP application metadata.

As described above, the simplified code editing tool can be arranged to analyse the source code and use the decorator declarations as markers to identify the decorator definition code (within which the ERP application metadata is located) and then extract the relevant metadata code (i.e. metadata code relating to the business rules of the business objects).

The simplified code editor can then present the ERP application metadata code on a simplified user interface enabling a user, who is not a coding expert, to make relevant modifications (e.g. update the business rules etc). Moreover, once the modifications to the ERP application metadata are made, they can be readily "injected" back into the source code by the simplified code editing tool simply updating the relevant parts of the decorator definition code in accordance with the modifications made by the user.

Such a simplified code editing tool is particularly appropriate for a coding non-expert who must update specific parts of the code (e.g. the business rules). This is because, to use the simplified code editing tool to update the ERP application metadata, the coding expertise that would normally be required to manually isolate and modify relevant parts of the code (i.e. the business rules metadata) using a conventional code editor is not required because the tool itself isolates and identifies the metadata. To operate such a simplified code editor, it is only necessary to understand the ERP application metadata (JSON code specifying business rules). Such a simplified code editor can be readily operated by, for example an accounting expert who is not a coding expert.

Furthermore, advantageously, by adopting the structure explained with reference to FIG. 3 (i.e. whereby each business object rule is associated with a class property) the variables of the business object rule can be accessed as properties of a "typed" object. This means that useful features can be included in the simplified editing tool including autocomplete (e.g. Microsoft IntelliSense).

Further, if variables of the business object rule are renamed, this update can be made in all other references to that variable negating the need to provide a separate parser or cross-reference engine. Further, the code can be more reliably validated when compiled.

Figure 4:
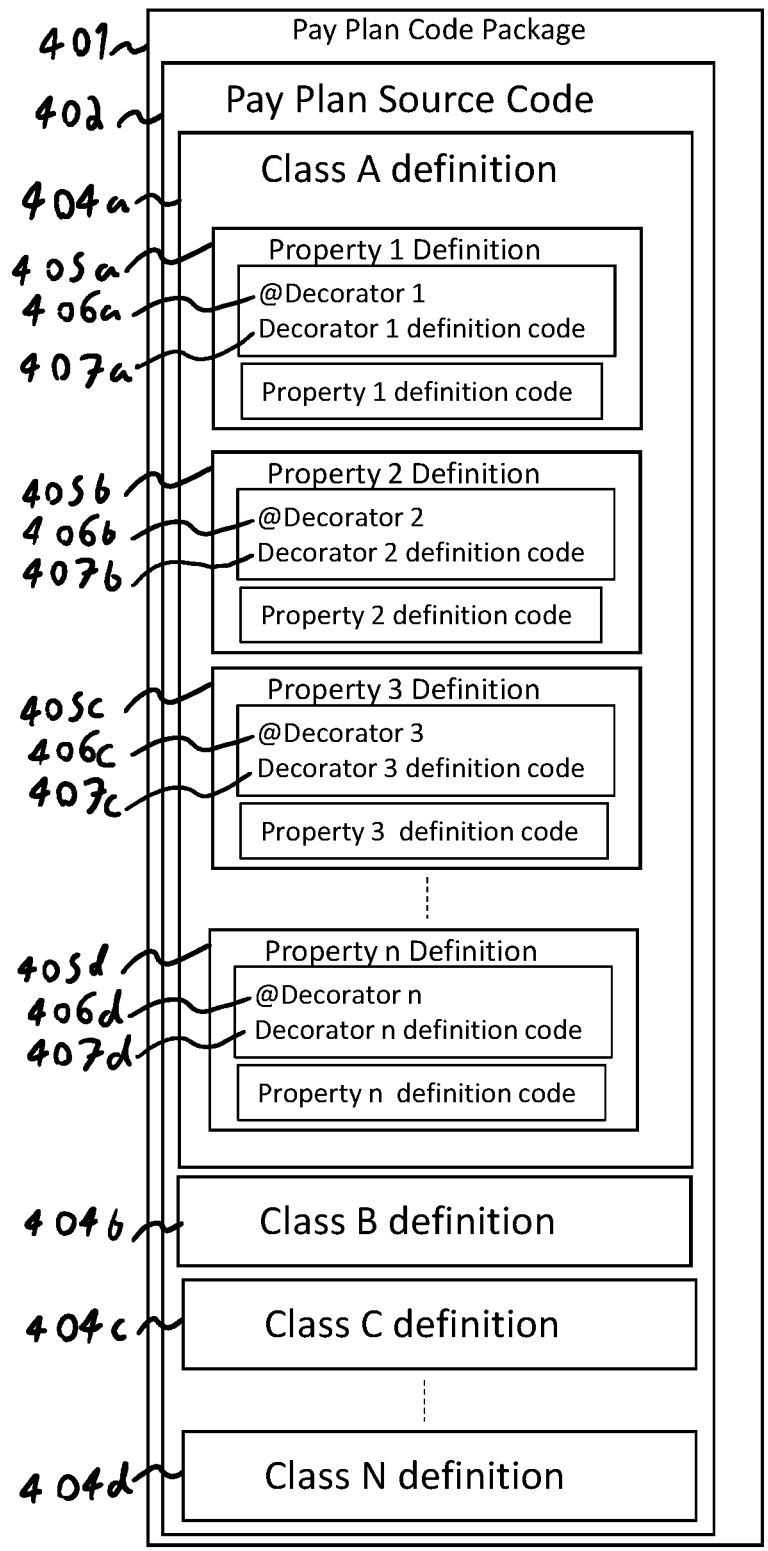
FIG. 4 provides a schematic diagram depicting the arrangement of another code package in accordance with certain embodiments of the disclosure, and FIG. 5 provides a flow diagram of a process for modifying code in accordance with certain embodiments of the disclosure.

FIG. 4 depicts an example pay plan code package 401 arranged in accordance with certain examples of the technique and suitable for use with the technique described with reference to FIG. 2. The pay plan code package can be used to implement an application providing a payroll calculation engine. The application receives employee data, performs payroll calculations and generates corresponding payroll data.

The pay plan code package comprises code defining a number of pay plan elements corresponding to part of the payroll data output. For example, one pay plan element may relate to net salary, another to income tax amount, another to pension contribution and so on.

Each pay plan element is defined by one or more functions.

These functions implement the various formulas and conditions necessary to determine the output associated with the pay plan element. The formulas and conditions are typically updated by modifying the variables of the functions. These variables of the functions are metadata (pay plan metadata)—that is, they define how data (e.g. the employee pay data) is processed by the payroll application.

The pay plan code package 401 comprises pay plan source code 402 which comprises code which implements the pay plan. The pay plan source code 402 is typically stored in a code repository as it is developed/modified. When the source code is finalised, it is published to a package repository.

The pay plan source code 402 typically includes code defining one or more classes 404a, 404b, 404c, 404d.

The code defining each class typically contains code defining a number of class properties 405a, 405b, 405c, 405d. Typically, each class property is associated with a pay plan element. For example, with reference to FIG. 5, the first class property code 405a defines a first pay plan element; the second class property code 405b defines a second pay plan element; the third class property code 405c defines a third pay plan element; and the nth class property code 405d defines an nth pay plan element. As described above, each value or values defined by a pay plan element are determined by various formulas and conditions. These formulas and conditions are defined by pay plan metadata (i.e. the variables associated with the functions that define the formulas and conditions).

The formulas and conditions associated with the pay plan elements, rather than being defined directly in the source code are instead incorporated into the class property definitions by the insertion in the code of TypeScript decorator declarations 406a, 406b, 406c, 406d and corresponding decorator definition code 407a, 407b, 407c, 407d. The decorator definition code 407a, 407b, 407c, 407d comprises pay plan metadata code defining the pay plan metadata.

The decorator definition code 407a, 407b, 407c, 407d defines the decorators used in the pay plan source code 402. The decorator definition code 407a, 407b, 407c, 407d specifies the functions that define the formulas and conditions associated with the pay plan elements (these formulas and conditions are typically expressed as TypeScript functions). In this way, the data associated with a pay plan that typically requires frequent updating by a non-coding expert (i.e. the pay plan metadata specifying the variables of the functions that define the formulas and conditions) is entirely contained within the decorator definition code.

Examples of the technique have been described above with reference to an ERP application and a payroll application. It will be understood however that the technique can be applied to many other types of application where application elements are defined by attributes that are defined by metadata. Other examples include applications which comprise functionality for generating user interfaces. Specifically, the technique can be used to develop and modify code associated with an application providing a graphical user interface. The source code defining such an application defines application elements such as graphical elements for display.

Examples of such graphical elements include for example pages, input fields, buttons, tables, graphs, etc. Each such graphical element is associated with one or more attributes, for example, one or more graphical properties defining how the graphical element is displayed. In accordance with examples of the technique, source code defining a code package relating to such a graphical user interface application comprises a plurality of decorator declarations and corresponding decorator declaration code. Each decorator declaration is associated with a graphical element and the corresponding decorator declaration code defines metadata which specifies the graphical properties associated with that graphical element. Other examples of metadata in this context include presentation attributes like choice of colour or font, and presentation rules such as rules that enable/disable components in response to clicks or selections made by the user.

FIG. 5 provides a flow diagram of a process for modifying source code undertaken by a simplified code editor running on a client device in accordance with certain embodiments of the disclosure. The process described with reference to FIG. 5 is typically provided by software running on the client device. The client device may be a special purpose computer including application specific integrated circuits, a general purpose computer, combinations of the same, and the like.

The code is arranged as described above, i.e. comprising source code annotated by one or more decorators and defining decorator definition code defining metadata code associated with each decorator.

At a first step S501, the code editor connects, typically via a suitable data network, to a repository and at a second step S502 downloads source code. At a third step S503, the code editor controls the client device to store the copy of the source code downloaded on to local storage on the client device. At a fourth step S504, the code editor analyses the code in the code package to identify decorators annotating the source code. At a fifth step S505, the code editor identifies the decorator definition code associated with the corresponding decorators. At a sixth step S506 the code editor identifies and extracts the metadata code in the decorator definition code and at a seventh step S507 presents the metadata code on a user interface. At an eight step S508, the code editor receives user input for modifying the metadata code (metadata modification data) and at a ninth step S509, the code editor makes corresponding modifications to the decorator definition code. At a tenth step 810, the code editor controls the client device to upload the modified source code to the repository.

It will be understood that the system depicted in FIG. 2 can be implemented in any suitable way. For example, the client devices can be provided by any suitable computing device such as a personal computer or client server connected, via a suitable data connection, such as the internet, to an application server on which the code repository is implemented. The client devices and the application server may be in different physical locations or the same physical location. It will be understood that the computing device typically includes components including a central processing unit (CPU), physical data storage, I/O components, and network components.

Similarly, the application server can be implemented in any suitable way. For example, the application server can be provided by one or more hardware server units or can be provided by a cloud-based server implementation.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The subject technology is not restricted to the details of the foregoing embodiment(s). The subject technology extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A system for modifying source code, said system comprising:
   a repository for storing code; and
   a first code editor operable to:
      access source code stored in the repository, said source code for implementing a software application or part of a software application and annotated by one or more decorators;
      identify from the source code one or more TypeScript decorator declarations;
      identify decorator definition code associated with each TypeScript decorator declaration;
      identify metadata code defined in the decorator definition code and associated with the implementation of the application;
      present the metadata code on a user interface;
      receive metadata modification data input by a user of the first code editor; and
      modify the metadata code in accordance with the metadata modification data;
   wherein the source code defines a plurality of application elements of the software application and each application element is associated with one or more attributes, each attribute defined by metadata code in the decorator definition code corresponding to the TypeScript decorator declaration associated with the application element, wherein the source code is written in TypeScript code, and wherein the one or more TypeScript decorator declarations modify, at run time, code features of the source code with which they are associated, said code features defining application elements of the software application.

2. A system according to claim 1, wherein the first code editor is operable to modify the metadata code by downloading a copy of the source code, modifying the metadata code of the copy of the source code in accordance with the metadata modification data and uploading a modified copy of the source code to the repository.

3. A system according to claim 1, wherein each attribute is defined by a class property annotated by one or more decorators.

4. A system according to claim 1, wherein the decorator definition code defines one or more functions and the metadata code comprises variables associated with the functions.

5. A system according to claim 1, further comprising a second code editor, said second code editor comprising a conventional code editor operable to enable a user to edit the code stored in the code repository.

6. A system according to claim 5, wherein the first code editor is run on a first client device and the second code editor is run on a second client device.

7. A system according to claim 6, wherein the code repository is run on an application server and the first client device and second client device are connected to the application server via a data network.

8. A system according to claim 1, wherein said application defined by source code comprises one or more TypeScript decorator declarations, each TypeScript decorator declaration associated with decorator definition code, said decorator definition code comprising metadata code and associated with the implementation of the application, wherein the source code defines a plurality of application elements of the software application and each application element is associated with one or more attributes, each attribute defined by metadata code in the decorator definition code corresponding to the TypeScript decorator declaration associated with the application element.

9. A method of modifying source code stored in a repository, said source code annotated by one or more decorators and for implementing a software application or part of a software application, said method comprising:
   accessing source code stored in the repository;
   identifying from the source code one or more TypeScript decorator declarations;
   identifying decorator definition code associated with each TypeScript decorator declaration;
   identifying metadata code defined in the decorator definition code and associated with the implementation of the application;
   presenting the metadata code on a user interface;
   receiving metadata modification data input by a user; and
   modifying the metadata code in accordance with the metadata modification data;
   wherein the source code defines a plurality of application elements of the software application and each application element is associated with one or more attributes, each attribute defined by metadata code in the decorator definition code corresponding to the TypeScript decorator declaration associated with the application element, wherein the source code is written in TypeScript code, and wherein the one or more TypeScript decorator declarations modify, at run time, code features of the source code with which they are associated, said code features defining application elements of the software application.

10. A simplified code editor for modifying source code stored in a repository, said source code annotated by one or more decorators and for implementing a software application or part of a software application, said code editor operable to:
   access source code stored in the repository, said source code for implementing a software application or part of a software application and annotated by one or more decorators;
   identify from the source code one or more TypeScript decorator declarations;
   identify decorator definition code associated with each TypeScript decorator declaration;
   identify metadata code defined in the decorator definition code and associated with the implementation of the application; present the metadata code on a user interface;
   receive metadata modification data input by a user of the code editor; and
   modify the metadata code in accordance with the metadata modification data;
   wherein:
   the source code defines a plurality of application elements of the software application and each application element is associated with one or more attributes, each attribute defined by metadata code in the decorator definition code corresponding to the decorator declaration associated with the application element, wherein the source code is written in TypeScript code; and
   the one or more TypeScript decorator declarations modify, at run time, code features of the source code with which they are associated, said code features defining application elements of the software application.

* * * * *